United States Patent [19]

Hoff, deceased

[11] Patent Number: 5,048,616
[45] Date of Patent: Sep. 17, 1991

[54] GARDEN TILLER TINE ASSEMBLY

[75] Inventor: Stephen J. Hoff, deceased, late of Richmond, Ind., by Kenneth L. Maurer, legal representative

[73] Assignee: Hoffco, Inc., Richmond, Ind.

[21] Appl. No.: 488,213

[22] Filed: Mar. 5, 1990

[51] Int. Cl.⁵ .............................................. A01B 33/08
[52] U.S. Cl. ........................................ 172/42; 172/60; 172/120; 172/123
[58] Field of Search .................. 172/42, 43, 48, 57, 172/60, 118, 120, 123, 124

[56] References Cited

U.S. PATENT DOCUMENTS

| | | | |
|---|---|---|---|
| 1,684,861 | 9/1928 | Dirschauer | 172/120 X |
| 2,256,185 | 9/1941 | Ariens | 172/120 |
| 2,835,182 | 5/1958 | Smithburn | 172/43 |
| 2,847,924 | 8/1958 | Quick | 172/42 |
| 2,957,529 | 10/1960 | Keller | 172/123 X |
| 3,040,590 | 5/1962 | Smithburn | 172/42 X |
| 3,658,135 | 4/1972 | Thompson | 172/42 |
| 4,365,673 | 12/1982 | Faulkner | 172/95 |
| 4,519,459 | 5/1985 | Reaume | 172/42 |

FOREIGN PATENT DOCUMENTS

| | | | |
|---|---|---|---|
| WO/0465 | 2/1984 | PCT Int'l Appl. | 172/42 |
| 165340 | 11/1964 | U.S.S.R. | 172/60 |
| 1113490 | 5/1968 | United Kingdom | 172/123 |

*Primary Examiner*—David H. Corbin
*Assistant Examiner*—Jeffrey L. Thompson
*Attorney, Agent, or Firm*—Barnes & Thornburg

[57] ABSTRACT

A garden tiller tine assembly for use with a tiller assembly which includes a drive shaft having a longitudinal axis of rotation includes a rotary blade aligned at a predetermined angle with respect to the axis of rotation. The planar body of the rotary blade is angled at a dihedral angle with respect to a plane normal to the axis of rotation. Upon rotation of the tine assembly about the axis of rotation, the rotary blade oscillates laterally from side to side along the axis of rotation to cut a wider path through the soil than conventional rotary blades.

19 Claims, 2 Drawing Sheets 5,048,616

GARDEN TILLER TINE ASSEMBLY

BACKGROUND AND SUMMARY OF THE INVENTION

The present invention relates to an assembly for scarifying soil, and particularly to a cutting head having a plurality of tine assemblies for use on a garden tiller or the like. More particularly, the present invention relates to a tine assembly including a rotary blade mounted on a rotable hub at a predetermined, nontransverse angle with respect to the axis of rotation of the hub so that the rotary blade oscillates from side to side upon rotation of the hub about its axis to cut a wider path through the soil than conventional tine assemblies.

Tillers or cultivators that are used to prepare soil for planting crops, grass, or other plants include tine assemblies which rotate to loosen the soil. It is desirable for the tiller to cut as wide a path as possible through the soil to reduce the number of passes necessary to prepare an area of ground for planting.

Attempts to increase the width of the path cut using a hand operated tiller by adding extra tine assemblies to the drive shaft of the tiller generally have not been effective. The number of tine assemblies which can be used in a hand operated tiller is limited because the addition of each tine assembly increases the force that must be exerted by an operator to control the tiller as it is pushed through a soil plot. Typically, a hand operated tiller includes between four and six tine assemblies for loosening the soil.

One method of increasing the width of ground that each rotary blade of the tine assembly cuts is to increase the length of the tines which extend away from each rotary blade. As the length of the tines increase, however, the likelihood that one of the tines will break during operation of the tiller also increases. It is therefore desirable to provide a tine assembly that will cut a wide path through the soil without increasing the length of the tines in order to minimize the problem of tine breakage.

One object of the present invention is to provide a tine assembly for cutting a wide path through the soil having tines of a short length selected to ensure that the tines will not generally break during normal operation of a tiller on which the tine assembly is mounted.

Another object of the present invention is to provide a tine assembly which is compatible with existing tiller assemblies so that the tine assembly can be used without modification of the existing tiller.

Yet another object of the present invention is to provide a tine assembly which digs, lifts, and recuts the soil to reduce the number of passes that must be made through the soil to prepare the soil for planting.

According to the present invention, a rotary blade for use on a drive shaft of a tiller comprises a central mounting region oriented in a first plane and a blade body portion oriented in a second plane skewed with respect to the mounting region. The blade body portion of the rotary blade oscillates from side to side in response to rotation of the drive shaft.

In a preferred embodiment of the present invention, a tine assembly is provided for use with a tiller assembly including a drive shaft having an axis of rotation. The tine assembly includes at least one rotary blade and means for mounting the at least one rotary blade to the drive shaft to align each rotary blade at a predetermined angle with respect to the axis of rotation. Upon rotation of the drive shaft each rotary blade oscillates from side to side to cut a wider path through the soil than rotary blades of conventional tine assemblies.

Each rotary blade is oriented to lie at an angle of about 5° with respect to a plane perpendicularly transverse or normal to the axis of rotation of the rotary blade. The mounting means includes a hub configured to surround the drive shaft. The hub includes a face plate for coupling the rotary blade to the hub.

One feature of the present invention is the provision of a tine assembly having a rotary blade situated at an angle with respect to the axis of rotation of the drive shaft on which the tine assembly is mounted so that the rotary blade is not parallel to a plane normal to the axis of rotation. Advantageously, such a configuration causes side-to-side oscillation of the rotary blade along the axis of rotation as the tine assembly is rotated. This lateral oscillation of the rotary blade maximizes the width of soil that the blade cuts and minimizes the length of the tines that extend away from the blade. Accordingly, the tine assembly is designed to cut a wider path through the soil than existing tine assemblies which can be mounted on existing tillers without modifying the existing tiller. Advantageously, the tine assemblies of the present invention are configured to be used on most existing tillers without the added cost of altering the tiller.

Yet another feature of the invention is the provision of a uniform, symmetrically shaped rotary blade which can be mounted on a hub in several selected orientations so that the angle of the rotary blade with respect to the longitudinal axis of the hub can be readily changed. Advantageously, such a symmetrical configuration permits an operator of the tiller to stock only one type of rotary blade for replacement purposes in case of breakage. In addition, production costs for the rotary blades are reduced because there is no need to produce several styles of the rotary blades in order to permit the rotary blades to be mounted in various orientations. Thus, a single machine can produce a rotary blade which can be mounted at any desired orientation on the tiller.

Additional objects, features, and advantages of the invention will become apparent to those skilled in the art upon consideration of the following detailed description of the preferred embodiment exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
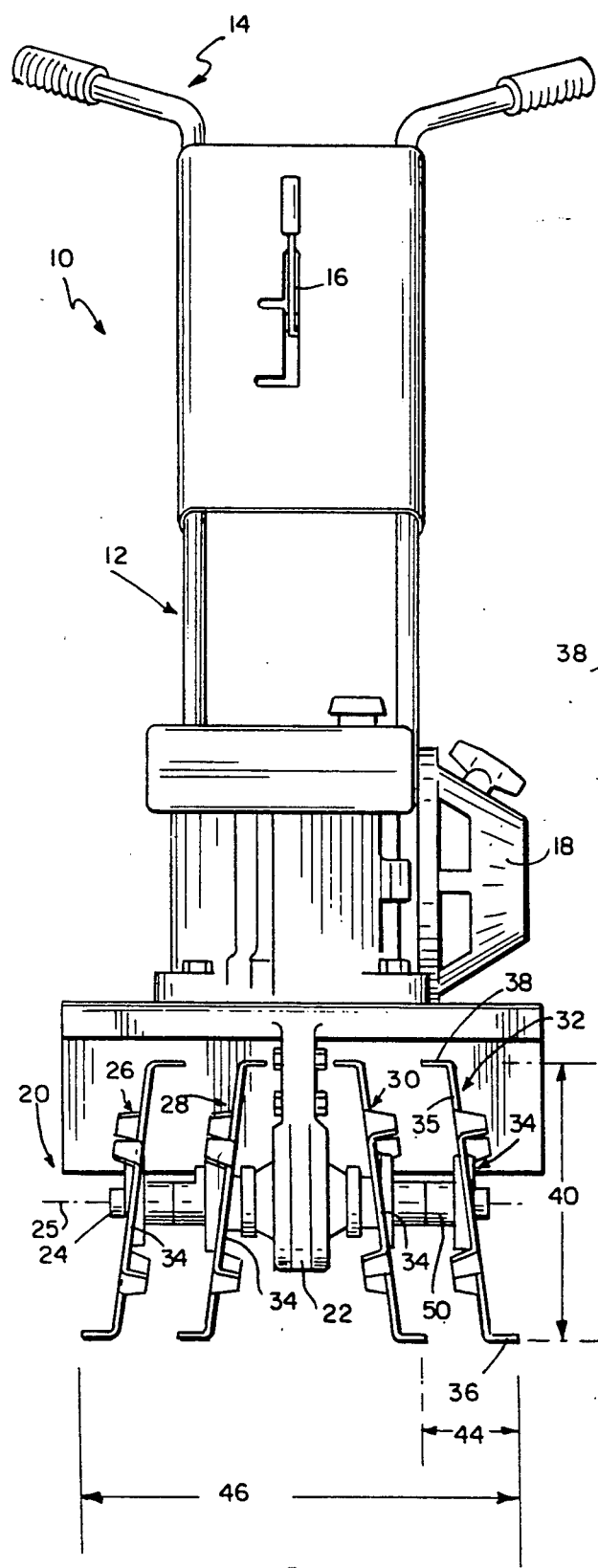
FIG. 1 is a front elevational view of a garden tiller showing a cutting head having a plurality of tine assemblies constructed according to the present invention and oriented to lie in two different sloping orientations relative to the drive shaft of the tiller.

A hand operated garden tiller 10 shown in FIG. 1 includes a frame assembly 12 including an upper handle portion 14, a control mechanism 16, and a motor or engine 18 for controlling and powering a cutting head 20 of the tiller 10. The cutting head 20 includes a drive member 22 for rotating a drive shaft 24 of the tiller 10 about its axis of rotation 25. A plurality of tine assemblies 26, 28, 30, and 32 are mounted on the drive shaft 24. Each tine assembly 26, 28, 30, 32 includes a rotary blade 34 and a collar or hub 50 for attaching the rotary blade 34 to the drive shaft 24.

The tine assemblies 26 and 28 mounted on a first end of the drive shaft 24 are shown mounted to align the rotary blades 34 at a first predetermined acute angle with respect to the axis of rotation 25. The rotary blades 34 of tine assemblies 26 and 28 on the first end are parallel to each other and have a positive slope with respect to the axis rotation 25.

The tine assemblies 30 and 32 on a second end of the drive shaft 24 are shown to be mounted to align the rotary blades 34 at a second predetermined angle with respect to the axis of rotation 25. The rotary blades 34 of tine assemblies 30 and 32 are parallel to each other and are oriented at a negative slope with respect to axis rotation 25.

By mounting the rotary blades 34 of tine assemblies 26, 28, 30, and 32 on the first and second ends of the drive shaft 24 in a configuration as shown in FIG. 1, the tiller 10 tends to travel in a straight path while cutting the soil. Were all the rotary blades 34 mounted parallel to each other at an acute angle with respect to the axis of rotation 25, the tiller 10 would tend to pull in one direction or another and would be hard for an operator to steer or control.

By situating the tine assemblies 26, 28, 30, and 32 so that the rotary blades 34 are aligned at an acute angle with respect to the axis of rotation 25, the rotary blades 34 move laterally from side to side upon rotation of the drive shaft 24. Each rotary blade can therefore cut a wider path through the soil upon rotation of the drive shaft 24.

All four tine assemblies 26, 28, 30, and 32 shown in FIG. 1 include an identical rotary blade 34. The rotary blade 34 is shown to include a plurality of tines 35 extending generally radially away from the axis of rotation 25 to lie in a plane aligned at an angle with respect to the axis of rotation 25. The tines 35 include flange portions 36 and 38 which extend alternately in opposite directions generally parallel to the axis of rotation 25.

Tine assembly 32 illustratively cuts a path having a width 44 through the soil upon rotation of the tine assembly 32 around the axis of rotation 25. Therefore, tine assemblies 30 and 32 cooperate to cut a path through the soil wider than the length of the flanges 36 and 38 which extend away from tines 35 of the rotary blade 34. The side to side oscillation of rotary blades 34 permits the width of the path cut by the rotary blades 34 to be increased without increasing the length of flanges 36 and 38. By keeping the length of flanges 36 and 38 relatively short, the likelihood of breaking the tines 35 is reduced.

The four tine assemblies 26, 28, 30 and 32 cooperate to cut a path through the soil having a width illustrated by dimension 46. The side to side oscillation of the rotary blades 32 also causes the depth of cut of the rotary blades 34 to vary.

Figure 2:
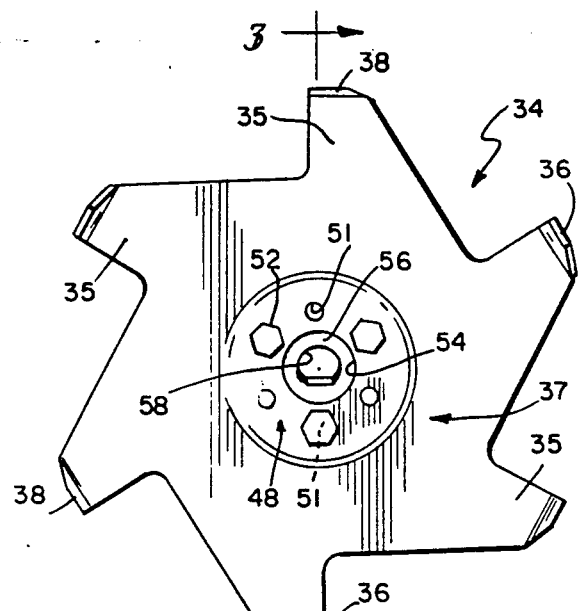
FIG. 2 is an elevational view of a preferred embodiment of a tine assembly in accordance with the Present invention showing the orientation of a plurality of tines around the outer periphery of a rotary blade.

As shown in FIG. 2, each rotary blade 34 has a circular mounting region 48. A plurality of tines 35 extend generally radially away from the mounting region 48 of the rotary blade 34. The tines 35 are equally spaced around the periphery of the rotary blade 34 and form a planar blade body portion 37 of the rotary blade 34.

End portions or flanges 36 and 38 of the tines 35 are alternately formed to extend substantially perpendicularly away from the tines 35 in opposite directions. The flanges 36 are bent in a first direction as illustrated by arrow 67 in FIG. 3, and flanges 38 of selected other tines 35 are bent in a second direction as illustrated by arrow 69. By bending the flanges 36 and 38 of the tines 35 in opposite directions, the rotary blade 34 cuts a larger area of soil with each pass.

Mounting region 48 of rotary blade 34 is formed to include a plurality of apertures 51 which are equally spaced apart and located an equal distance from a central aperture 54 of rotary blade 34. The apertures 51 are configured to receive a plurality of fasteners 52 for coupling the rotary blade 34 to a hub 50 as shown in FIG. 3

Rotatable hub 50 includes a face plate 60 and an integral sleeve 61. Face plate 60 and sleeve 61 are formed to include an aperture 58 situated along the axis of rotation 64 of hub 50. When hub 50 is mounted on drive shaft 24, the axis of rotation 64 of hub 50 is coaxially aligned with the axis of rotation 25 of drive shaft 24. Aperture 58 may illustratively be D-shaped so that the hub 50 can be nonrotatively mounted to drive shaft 24 of tiller 10.

The face plate 60 includes a raised central portion 56 and three equally spaced apertures 62. The central aperture 54 of rotary blade 34 fits over the raised portion 56 of hub 50 to align the rotary blade 34 on the hub 50 so that the mounting region 48 of rotary blade 34 abuts face plate 60. Face plate 60 lies in a plane which is normal to the axis of rotation 64 of hub 50.

Figure 3:
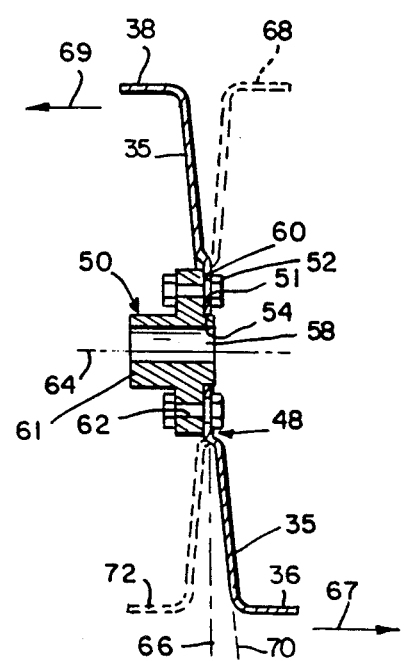
FIG. 3 is a dead sectional view taken along lines 3—3 of FIG. 2 showing the angle at which the rotary blade is mounted relative to the axis of rotation of the drive shaft supporting the rotary blade and illustrating the width of the path cut by the rotary blade.

The angle at which the rotary blade 34 is oriented relative to the axis of rotation 64 of hub 50 is illustrated in FIG. 3. Line 66 represents a plane normal to the axis of rotation 64 of hub 50. Rotary blade 34 is oriented at an acute angle with respect to the axis of rotation 64 of hub 50. Mounting region 48 is mounted to lie in a plane parallel to the plane of face plate 60 so that the body portion of the rotary blade 34 is oriented to lie at a predetermined acute angle with respect to the normal plane 66. The rotary blade 34 may illustratively be angled about 5° with respect to plane 66. Therefore, the rotary blade 34 is aligned in a single plane illustrated by line 70 which is oriented at a predetermined dihedral angle with respect to the normal plane 66.

The rotary blade 34 will rotate as the hub 50 is rotated about axis of rotation 25 of drive shaft 24. The dotted line 68 in FIG. 3 illustrates the position of flange 36 of a tine 35 when it is rotated 180° around longitudinal axis 64. Dotted line 72 illustrates the position of flange 38 when it is rotated 180° around longitudinal axis 64.

As the tine assembly is rotated, the rotary blade 34 digs, lifts, and recuts the soil. Conventional blade assemblies out only along either side of line 66 shown in FIG. 3 by a distance equal to the length of the flanges extending away from the rotary blade 34. Flange 36 of the present rotary blade 34 digs and lifts soil on the right side of line 66, and as the rotary blade 34 continues to rotate, flange 38 recuts the soil on the left side of line 66. Therefore, the present invention cuts a wider path through the soil than a conventional tine assembly.

As best shown in FIG. 2, mounting region 48 of rotary blade 34 is formed to include a greater number of apertures 51 than the number of apertures 62 formed in hub 50. This permits rotary blade 34 to be mounted on hub 50 in a plurality of orientations. Hub 50 may illustratively include three such mounting apertures 62, and mounting region 48 may illustratively include six apertures 51. This permits the blade assembly to be mounted in six different orientations on hub 50. It is understood that the number of apertures can be increased to increase the number of orientations in which the rotary blade 34 can be mounted on hub 50.

Because the rotary blade 34 is angled with respect to mounting region 48, changing the orientation of rotary blade 34 with respect to hub 50 changes the angle at which the blade body of rotary blade 34 is angled with respect to the longitudinal axis 64 of hub 50. Therefore, the same style of rotary blade 34 can be used for each of the tine assemblies 26, 28, 30, and 32 shown in FIG. 1.

The rotary blades 34 of tine assemblies 26 and 28 on the second end of the drive shaft are rotated 180° as compared with rotary blades 34 of tine assemblies 30 and 32 on the first end of the drive shaft 24. By rotating the rotary blades 34 of tine assemblies 26 and 28 on the second end of drive shaft 24 by 180°, the angle of the rotary blades 34 with respect to the axis of rotation 26 on the second end of drive shaft is opposite the angle of the rotary blades 34 on the first end of the drive shaft 24.

It is understood that although the drawings illustrate the rotary blade 34 having a mounting region 48 and a skewed blade body portion 37, the same result may be obtained in other ways. A Planar rotary blade may be used with mounting hub having a face plate oriented at a predetermined angle with respect to the axis of rotation of the drive shaft. When the planar rotary blade abuts the skewed face plate the rotary blade will oscillate from side to side in response to rotation of the drive shaft.

Figure 4:
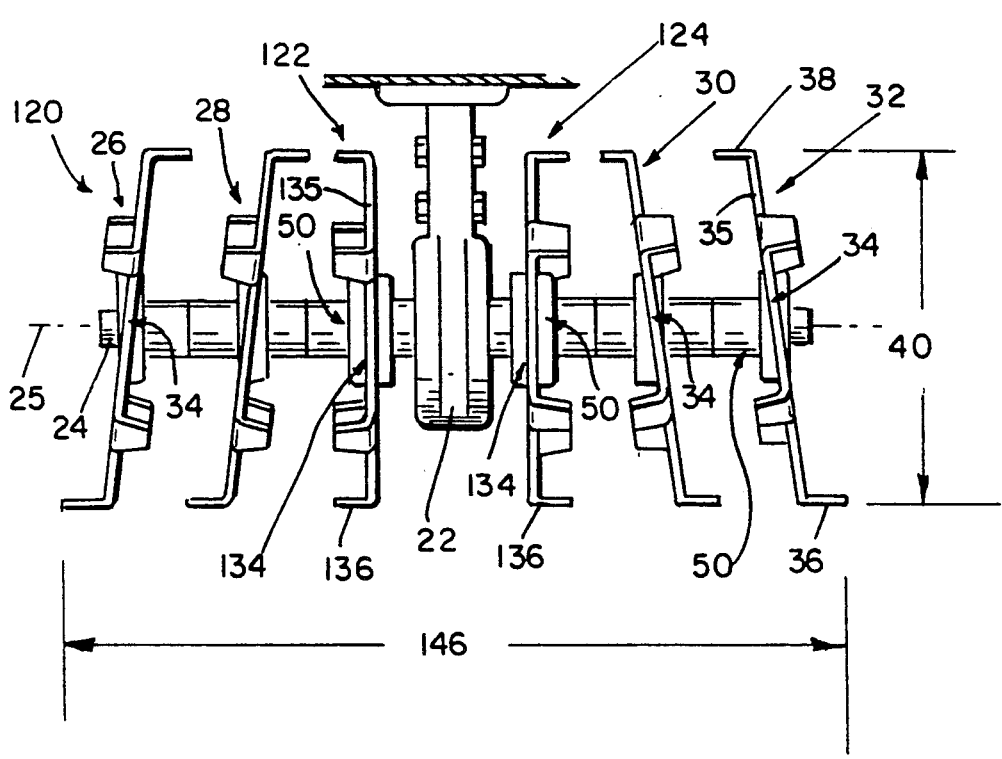
FIG. 4 is a front elevational view of a cutting head assembly of a second embodiment of the present invention.

Another embodiment of the present invention is illustrated in FIG. 4. Those elements referenced by numbers identical to those in FIGS. 1-3 perform the same or similar function. In the embodiment shown in FIG. 4, a cutting head 120 includes a drive member 22 for rotating a drive shaft 24 about its axis of rotation 25. The configuration of tine assemblies 26, 28, 30, and 32 is similar to the configuration shown in FIG. 1.

In the embodiment shown in FIG. 4, two additional tine assemblies 122 and 124 have been added to the drive shaft 24. Tine assembly 122 includes a rotary blade 134 mounted in a plane normal to the axis of rotation 25. Rotary blade 134 includes a plurality of tines 135 extending generally radially away from the axis of rotation 25. The tines 135 include flange portions 136 which extend in a direction away from drive member 22 and lie generally parallel to the axis of rotation 25.

Rotary blade 134 of tine assembly 124 is identical to the rotary blade 134 of tine assembly 122. Rotary blade 134 of tine assembly 124 is mounted so that the flanges 136 extend in an opposite direction from the flanges 136 on rotary blade 134 of tine assembly 122. Rotary blades 134 of tine assemblies 122 and 124 are each mounted to the drive shaft 24 by a rotatable hub 50.

The addition of tine assemblies 122 and 124 to the drive shaft 24 provides further stability to the cutting head 120. Tine assemblies 122 and 124 reduce the likelihood that cutting head 120 will pull in one direction or another when the cutting head 120 moves through the soil. Therefore, the configuration shown in FIG. 4 makes the tiller easier to operate by increasing the likelihood that the tiller will travel in a straight path while cutting the soil. The addition of tine assemblies 122 and 124 also increases the width of soil that the tiller can cut with each pass. The six tine assemblies 26, 28, 122, 124, 30, and 32 cooperate to cut a path through the soil having a width illustrated by dimension 146.

Although the invention has been described in detail with reference to a preferred embodiment, variations and modifications exist within the scope and spirit of the invention as described and defined in the following claims.

What is claimed is:

1. An assembly for use with a tiller including a drive shaft having a longitudinal axis of rotation, the assembly comprising
at least one first rotary blade,
means for fixedly mounting the at least one first rotary blade to a first side of the drive shaft to align the at least one first rotary blade at a first predetermined angle with respect to the axis of rotation so that the at least one first rotary blade oscillates from side to side upon rotation of the drive shaft,
at least one second rotary blade,
means for fixedly mounting the at least one second rotary blade to a second side of the drive shaft to align the at least one second rotary blade at a second predetermined angle with respect to the axis of rotation so that the at least one second rotary blade oscillates from side to side upon rotation of the drive shaft, the at least one first rotary blade and the ate least one second rotary blade being angled in opposite directions at an angle of at least five degrees with respect to a plane normal to the axis of rotation,
a third rotary blade coupled to the first side of the drive shaft, and
a fourth rotary blade coupled to the second side of the drive shaft, the third and fourth rotary blades being oriented to lie in a plane normal to the axis of rotation.

2. The assembly of claim 1, wherein the means for mounting the at least one first and second rotary blades to the drive shaft includes a hub configured to surround the drive shaft, the hub having a face plate for coupling the at least one first and second rotary blades to the hub.

3. The assembly of claim 2, wherein the face plate is situated in a plane normal to the axis of rotation, the at least one first and second rotary blades each include a mounting region configured to abut the face plate and a planar body portion oriented at an angle with respect to the mounting region to align the planar body portion at the first and second predetermined angles with respect to the axis of rotation.

4. The assembly of claim 3, wherein the mounting regions of the at least one first and second rotary blades are formed to include a plurality of apertures configured to receive a plurality of fasteners for mounting the at least one first and second rotary blades on the face plate of the collar.

5. The assembly of claim 4, wherein the at least one first and second rotary blades have an identical symmetrical configuration including a first half body portion angled in a first direction away from the mounting region and a second half body portion angled in a second direction away from the mounting region to align the body portion of the rotary blades in a single plane which is oriented to lie at a dihedral angle with respect to a plane formed by the mounting region so that the symmetrical rotary blades can be mounted at either the first predetermined acute angle or at the second predetermined acute angle depending upon which side of the drive shaft the rotary blades is to be mounted.

6. The assembly of claim 1, wherein the assembly includes two first rotary blades aligned parallel to each other on the first side of the drive shaft at the first predetermined angle and two second rotary blades aligned parallel to each other on the second side of the drive shaft at the second predetermined angle.

7. The assembly of claim 1, wherein the at least one first and second rotary blades are formed to include a plurality of tines spaced along their outer peripheries, the tines being formed to include flanges which alternately extend away from the at least one first and second rotary blades in opposite directions.

8. The assembly of claim 7, wherein the tines are equally spaced around the periphery of the at least one first and second rotary blades.

9. The assembly of claim 8, wherein the at least one first and second rotary blades each include at least six tines.

10. An assembly for use with a tiller including a drive shaft having a longitudinal axis of rotation, the assembly comprising first, second, third, and fourth rotary blades, each rotary blade having a planar blade body portion, means for fixedly mounting the first rotary blade to a first side of the drive shaft to align the planar blade body of the first rotary blade at a first predetermined dihedral angle with respect to a plane normal to the longitudinal axis of rotation, means for fixedly mounting the second rotary blade to a second side of the drive shaft to align the planar blade body of the second rotary blade at a second predetermined dihedral angle with respect to the plane normal to longitudinal axis of rotation opposite of the first predetermined dihedral angle, and means for mounting the third and fourth rotary blades to the first and second sides of the drive shaft, respectively, to align the planar blade body portions of the third and fourth rotary blades in a plane normal to the longitudinal axis of the hub.

11. The assembly of claim 10, wherein the means for mounting the first and second rotary blades to the drive shaft includes a hub configured to surround the drive shaft, the hub having a face plate for coupling the first and second rotary blades to the hub.

12. The assembly of claim 11, wherein the face plate is situated in a plane normal to the axis of rotation, the first and second rotary blades each include a mounting region configured to abut the face plate and a planar body portion oriented at an angle with respect to the mounting region to align the planar body portion at the first and second predetermined angles with respect to the axis of rotation.

13. The assembly of claim 12, wherein the mounting regions of the first and second rotary blades are formed to include a plurality of apertures configured to receive a plurality of fasteners for mounting the one first and second rotary blades on the face place of the collar.

14. The assembly of claim 13, wherein the first and second rotary blades have an identical symmetrical configuration including a first half body portion angled in a first directions away from the mounting region and a second half body portion angled in a second direction away from the mounting region to align the body portion of the rotary blades in a single plane which is oriented to lie at a dihedral angle with respect to a plane formed by the mounting region so that the symmetrical rotary blades can be mounted at either the first predetermined acute angle or at the second predetermined acute angle depending upon which side of the drive shaft the rotary blades is to be mounted.

15. The assembly of claim 10, wherein the assembly includes two first rotary blades aligned parallel to each other on the first side of the drive shaft at the first predetermined angle and two second rotary blades aligned parallel to each other on the second side of the drive shaft at the second predetermined angle.

16. The assembly of claim 10, wherein the first and second rotary blades are formed to include a plurality of tines spaced along their outer peripheries, the tines being formed to include flanges which alternately extend away from the first and second rotary blades in opposite directions.

17. The assembly of claim 16, wherein the tines are equally spaced around the periphery of the first and second rotary blades.

18. The assembly of claim 17, wherein the first and second rotary blades each include at least six tines.

19. The assembly of claim 10, wherein the first and second rotary blades are angled in opposite directions at an angle of at least five degrees with respect to a plane normal to the axis of rotation.

* * * * *